E. L. McBRIDE.
PORTABLE OVEN.
APPLICATION FILED JUNE 7, 1919.
1,319,401.
Patented Oct. 21, 1919.
2 SHEETS—SHEET 1.
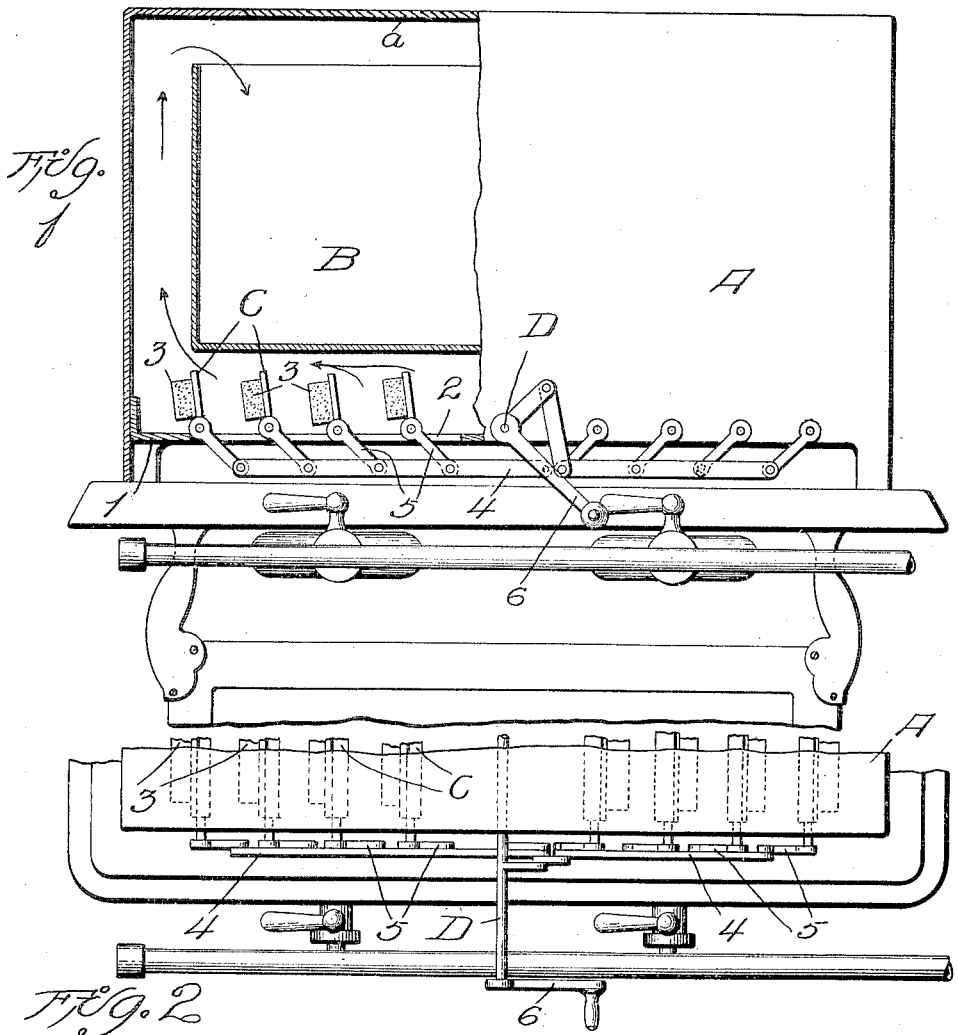
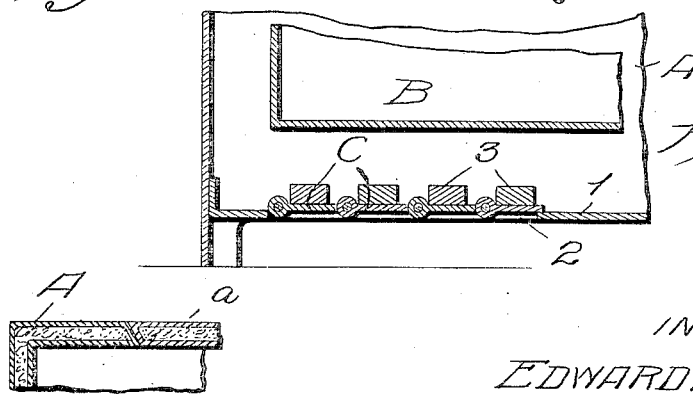
INVENTOR
EDWARD L. McBRIDE,
by Bakewell & Church Attys.

E. L. McBRIDE.
PORTABLE OVEN.
APPLICATION FILED JUNE 7, 1919.
1,319,401.
Patented Oct. 21, 1919.
2 SHEETS—SHEET 2.
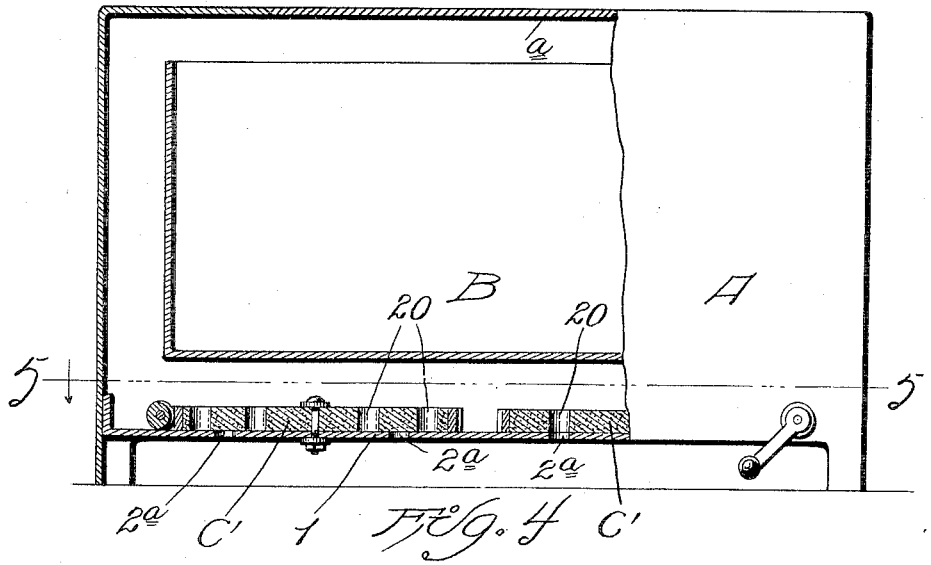
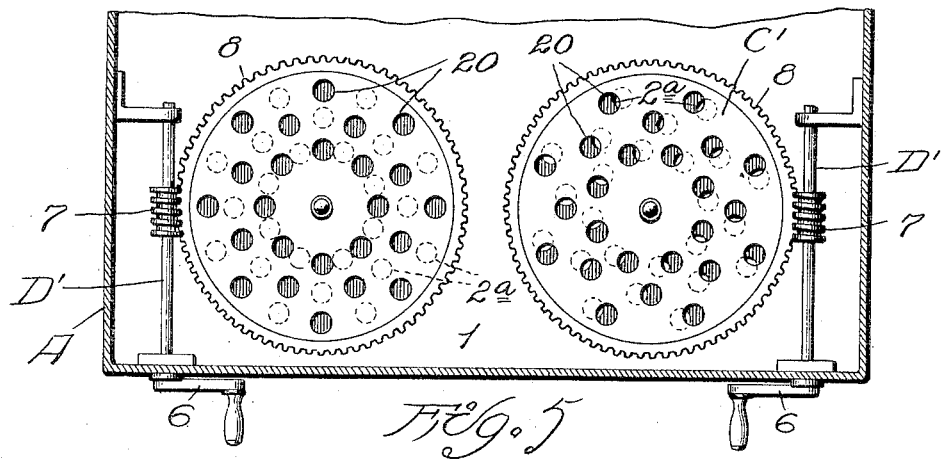
INVENTOR
EDWARD L. McBRIDE,
by Bakewell & Church, Attys.

UNITED STATES PATENT OFFICE.

EDWARD L. McBRIDE, OF ST. LOUIS, MISSOURI.

PORTABLE OVEN.

1,319,401.        Specification of Letters Patent.     Patented Oct. 21, 1919.

Application filed June 7, 1919. Serial No. 302,545.

*To all whom it may concern:*

Be it known that I, EDWARD L. MCBRIDE, a citizen of the United States, residing at St. Louis, Missouri, have invented a certain new and useful Improvement in Portable Ovens, of which the following is a full, clear, and exact description, such as will enable others skilled in the art to which it appertains to make and use the same.

This invention relates to portable ovens or fireless cookers of the kind that are adapted to be placed on top of a stove to preliminarily heat the food contained in the oven.

The main object of my present invention is to provide a portable oven or fireless cooker of the general type referred to, which comprises as a permanent part thereof a heat radiating device or member that absorbs heat from the stove during the preliminary heating of the food contained in the oven and which throws off or discharges its heat into the oven when the oven is thereafter closed or cut off from the atmosphere.

Another object is to provide a portable oven or fireless cooker in which the damper, valve or shutter that closes the opening through which heat is admitted to the interior of the oven during the preliminary heating operation, is provided with a heat radiating device or member formed of heat-retaining material that is positioned within the oven when said damper is closed and positioned in the path of the current of heated air that flows through said opening when said damper is in its open position. Other objects and desirable features of my invention will be hereinafter pointed out.

Figure 1 of the drawings is a front elevational view, partly in vertical section, of a portable oven or fireless cooker constructed in accordance with my invention.

Fig. 2 is a top plan view of a portion of said oven.

Fig. 3 is a vertical transverse sectional view of a portion of the oven, showing one set of valves or dampers closed.

Fig. 3ª is a sectional view of a portion of the outer casing.

Fig. 4 is a front elevational view, partly in vertical section, illustrating a modification of my invention; and Fig. 5 is a horizontal sectional view, taken on the line 5—5 of Fig. 4, looking in the direction indicated by the arrow and showing one of the valves in a slightly different position.

Referring to Figs. 1 to 3, which illustrate the preferred form of my invention, A designates the outer casing of my improved portable oven, and B designates the food compartment that is arranged inside of said casing, the casing A being insulated, as shown in Fig. 3ª, or of any other preferable construction, and the food compartment B being spaced away from the casing so as to form a chamber or flues through which heated air can circulate upwardly and over the upper edge of the food compartment B, as indicated by the arrows in Fig. 1, during the preliminary heating operation. The bottom 1 of the casing A is provided with one or more openings 2 so as to permit heat to enter the oven when the oven is arranged on the top of a stove, and the top of said casing is provided with a removable cover *a* that is adapted to be removed so as to permit the food to be introduced into the food compartment B. Preferably, two openings are formed in the bottom 1 of said casing at such points that when the oven is arranged on the top of a gas stove or gasolene stove the openings 2 will be in vertical alinement with the top burners of the stove, as shown in Fig. 1. Various means can be used for closing the openings 2, but I prefer to provide the oven with two sets of hinged or pivotally mounted valves or dampers C that can be opened by swinging them upwardly into a substantially vertical or upright position, as shown in Fig. 1, during the preliminary heating operation. Each of the valves or dampers C is provided with a heat radiating device 3 that is mounted on said valve in such a manner that it will be arranged within the oven when the valve is closed, as shown in Fig. 3, and arranged in the path of the current of heated air that flows through the opening 2 with which the valve coöperates during the preliminary heating operation. The heat radiating devices 3 can be formed from soapstone or any other suitable material that is capable of absorbing and retaining heat, and the valves or dampers C preferably consist of flat metal plates pivotally mounted on the bottom 1 of the casing A and arranged parallel to each other so that the valves C of each group will coöperate with each other to form a complete closure for the opening 2. Any suitable means may be employed for opening and closing the valves or dampers C, the means herein illustrated consisting of a rock shaft D mounted on the bottom of the casing A of the oven and connected by means of links 4 or in any other suitable manner with arms 5 secured to the valves C, said shaft D being provided at one end with an operating handle 6. When the shaft D is rocked in one direction the valves C of both groups will move simultaneously into their closed position, as shown in Fig. 3, and when said shaft D is rocked in the opposite direction said valves will swing upwardly into the chamber or flue beneath the bottom of the food compartment B.

To use the oven it is arranged in operative position on the top of a stove, and after the food has been placed in the food compartment B, the valves C are opened by swinging them upwardly, thereby permitting the heat that radiates from the top of the stove or from the top burners of the stove to circulate upwardly through the flues or chamber that surrounds the food compartment B, as indicated by the arrows in Fig. 1. During this period, namely, while the valves C are arranged in their open position, the heat radiating devices 3 on said valves will become highly heated, due to the fact that said devices 3 are arranged in the direct path of the currents of heated air that flow through the openings 2 in the bottom of the outer casing A of the oven. After the devices 3 have become heated to the proper temperature the valves C are closed by swinging them downwardly into the position shown in Fig. 3. Thereafter, the heat which the devices 3 absorbed during the preliminary heating operation will be thrown off or discharged from said devices 3 into the oven, thus completing the operation of cooking the food in the oven. The quantity of heat that is admitted to the oven through the openings 2 can be accurately controlled by opening the valves C more or less, and in view of the fact that said valves are pivotally mounted, they can be arranged in an inclined position so as to deflect the heat toward the vertical flues up through which the heat travels to the open upper end of the food compartment B.

In Figs. 4 and 5 of the drawings I have illustrated a modification of my invention, wherein the means that governs the admission of the heat to the interior of the oven and cuts off the interior of the oven from the atmosphere consists of two oscillating valves or dampers C' formed of soapstone of some other suitable heat retaining material and provided with openings 20 that are adapted to be brought into and out of registration with holes 2ª in the bottom 1 of the outer casing A by turning said valves. Any suitable means can be employed for opening and closing the valves C', such, for example, as manually-operable shafts D' provided with worms 7 that mesh with gears 8 on the peripheries of the valves C'.

During the preliminary heating operation one or both of the valves C' are turned into such a position that the holes 20 therein either are in exact alinement with the holes 2ª in the bottom of the outer casing of the oven, or are in approximate alinement with the holes in the bottom of the oven, thereby permitting the heat from the stove to pass into the interior of the oven. In practice it is preferable to arrange the valves C' in such a position during the preliminary heating operation that portions of same partially overlap openings 2ª in the bottom of the oven, thereby causing the currents of heated air that flow into the oven to act directly on said valves and heat them to a high temperature.

A device of the construction above described can be easily applied to or removed from the top of a stove; it is as efficient for cooking food as the heavy, cumbersome fireless cookers now in general use and it is more efficient and convenient to operate than portable ovens of the kind heretofore in use and equipped with dampers for controlling inlet openings in the bottom of the oven, due to the fact that my improved oven or fireless cooker comprises as a permanent part thereof a heat radiating device that becomes highly heated during the preliminary heating operation and which throws off or discharges heat into the oven when the oven is closed or cut off from the atmosphere.

Having thus described my invention, what I claim as new and desire to secure by Letters Patent, is:

1. A fireless cooker or oven provided in its bottom with an opening through which heat enters the oven when the oven is placed on the top of a stove or over a heating device, and means for closing said opening comprising a member or device formed of heat-retaining material and arranged in such a manner that it will become highly heated during the preliminary heating operation and will throw off or discharge its heat into the oven when said opening is closed to cut off communication between the interior of the oven and the atmosphere.

2. A portable oven or fireless cooker, comprising an outer casing provided in its bottom with an opening for admitting heat to the interior of the oven when the oven is arranged on top of a stove or over a heating device, and a closure for said opening provided with a portion formed of heat-retaining material arranged in such a manner that it will be positioned in the path of the current of heated air that enters the oven during the preliminary heating operation and positioned within the oven when said opening is closed.

3. A portable oven or fireless cooker provided with an opening through which heat is admitted to the interior of the oven when the oven is arranged in proximity to a heating device, means for closing said opening so as to cut off communication between the interior of the oven and the atmosphere, and a heat radiating device formed of heat-retaining material combined with said means in such a manner that it will become highly heated during the preliminary heating operation and will be positioned within the oven, thus supplying heat to the oven, when said opening is closed.

4. A portable oven or fireless cooker, comprising an outer casing provided in its bottom with an opening for admitting heat to the interior of said oven, and a pivotally mounted closure for said opening having a heat radiating device of heat-retaining material arranged on one side of same.

5. A portable oven or fireless cooker, comprising an outer casing having an opening in one wall of same through which heat is admitted to the interior of the oven when the oven is arranged on the top of a stove or in proximity to a heating device, a plurality of pivotally mounted valves that form a closure for said opening, means for operating said valves, and heat radiating devices of heat-retaining material combined with said valves in such a manner that said heat radiating devices will be positioned in the path of the current of heated air that flows through said opening when the valves are opened and positioned within the oven when said valves are closed.

6. A portable oven or fireless cooker, comprising an outer casing provided in its bottom with two openings, a group of pivotally mounted valves or dampers for each of said openings, a heat radiating device of heat-retaining material connected to each of said valves, and an operating means for said valve.

7. A portable oven or fireless cooker, comprising an outer casing having an opening formed in the bottom of same, a food compartment arranged inside of said casing and spaced away therefrom, a closure for the opening in the bottom of the casing that is adapted to absorb heat from the device used to preliminarily heat the oven and thereafter throw off or discharge its heat into the oven when said opening is closed, and means for moving said closure into its open and closed positions.

EDWARD L. McBRIDE.

Copies of this patent may be obtained for five cents each, by addressing the "Commissioner of Patents, Washington, D. C."